March 12, 1963 E. P. G. WRIGHT 3,081,451
SERIAL NUMBER ISSUING EQUIPMENT
Filed Dec. 10, 1957 4 Sheets-Sheet 1

Inventor
E. P. G. Wright
By Robert Harding Jr.
Attorney

March 12, 1963 E. P. G. WRIGHT 3,081,451

SERIAL NUMBER ISSUING EQUIPMENT

Filed Dec. 10, 1957 4 Sheets-Sheet 2

Inventor
E. P. G. Wright
By Robert Harding Jr.
Attorney

March 12, 1963 E. P. G. WRIGHT 3,081,451

SERIAL NUMBER ISSUING EQUIPMENT

Filed Dec. 10, 1957 4 Sheets-Sheet 3

Inventor
E. P. G. Wright
By Robert Harding Jr.
Attorney

Inventor
E.P.G. Wright
By Robert Harding Jr.
Attorney 3,081,451

SERIAL NUMBER ISSUING EQUIPMENT

Esmond Philip Goodwin Wright, London, England, assignor to International Standard Electric Corporation, New York, N.Y., a corporation of Delaware Filed Dec. 10, 1957, Ser. No. 701,767
Claims priority, application Great Britain Dec. 18, 1956
6 Claims. (Cl. 340—345)

This invention relates to counters, distributors and the like.

The object of the invention is to adapt known information storage devices for the above purposes.

One aspect of the invention comprises a counter distributor or the like for numbers having a plurality of digits comprising a like plurality of sets of ferric storage cells, each comprising a number of storage cells equal to the digital basis "Y," and control means for adding to the number recorded, means for reading the digital record from an operated cell and rewriting the record in a succeeding cell on a closed loop basis for the first, first and second, . . . sets, according to whether the record being read does not or does include "Y"—1 in the first set, first and second sets, and so on.

Another aspect of the invention comprises a counter distributor or the like for numbers having a plurality of digits, comprising $x$ sets of $y$ ferric storage cells, where $y$ is equal to the digital basis, required, scanning equipment and reading equipment for reading said sets of cells serially in the following order: complete first set, first cell of first set for second time complete second set, first cell of second set for second time, and so on, writing equipment, control equipment for advancing the "units" digit by one during each scanning cycle including the step from "nine" to "zero," recording equipment for recording the detection of, for example, a first or second digital element in position "Y"—1, and control equipment for reading out a digital element from a cell, for example, of the second or third (or both) sets and so on, and rewriting a digital element in a succeeding cell of another set when the recording equipment has recorded the detection of a first or second digital element and so on, in position "Y"—1.

The term closed loop basis means that the cells in each of the sets of cells are scanned in turn and in the following order: the first cell to the last cell and back to the first cell, the scan being continually repeated.

The invention will be clearly understood from the following description of certain embodiments shown in the following drawings in which.

Figure 1:
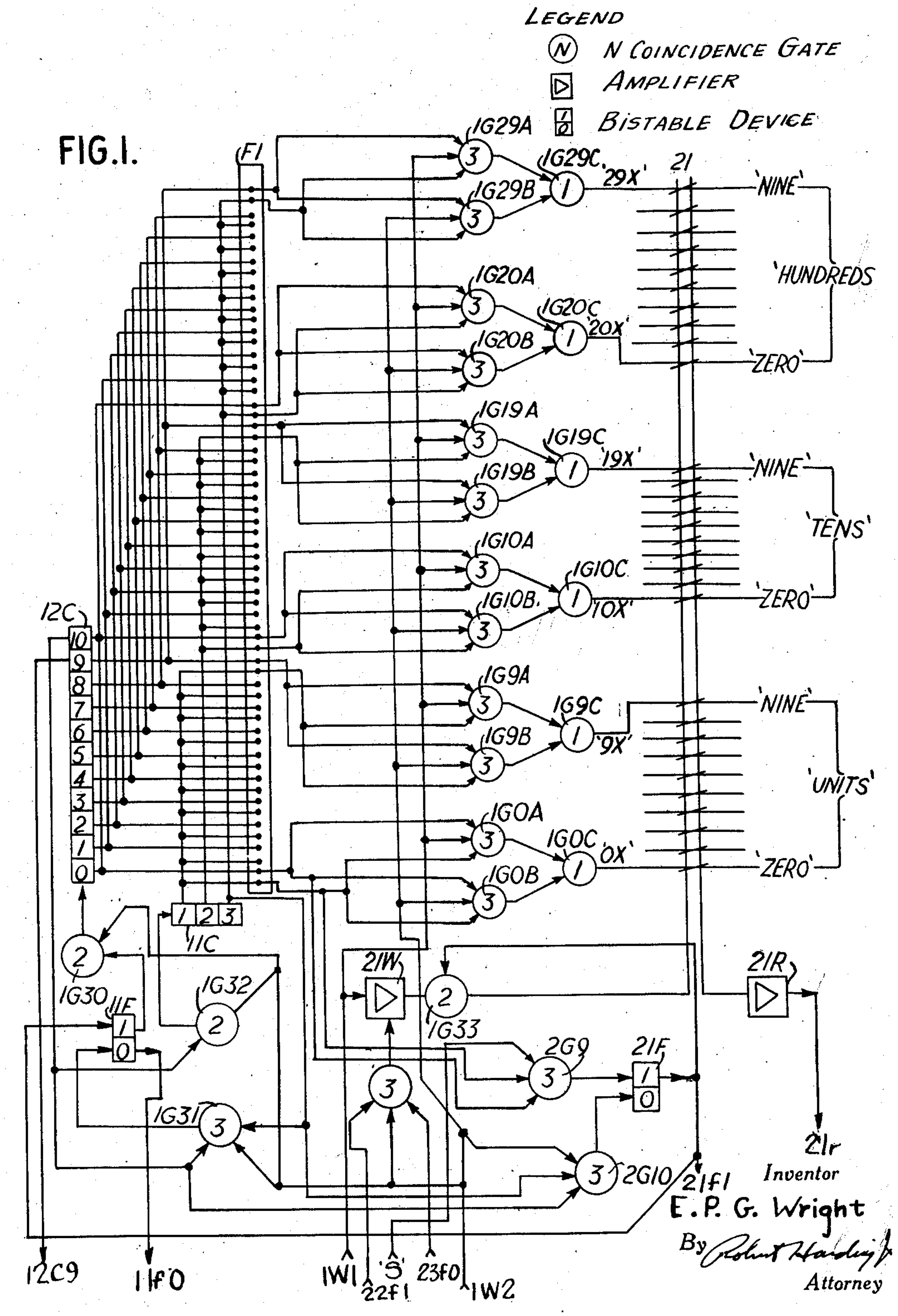
FIG. 1, shows an access selector and a single column counter.

In conventional multi-stage closed ring gas tube counter circuits, the process of decimal additions through successive decades including the zeroising of the "units," "tens" and "hundreds" digit etc., when their "nine" positions are reached is accomplished by successive tubes in a chain being triggered by a preceding tube via its cathode and coupling circuit to the trigger electrode of the next tube, such that as one tube "fires," the preceding tube becomes non-conducting This sequence recurs until the last tube, i.e. the "nine" tube is caused to trigger off the first tube in the chain, i.e. the "zero" tube again via its cathode and coupling circuit to the trigger electrode. The process of carrying from decade to decade is accomplished by applying the output from the cathode of the "nine" tube via a gate controlled by the counting pulse supply to the trigger electrodes of the tubes in the next decade As many decade stages as may be required can be operated in this manner. The decimal number counter described in this invention is constituted by a single column ferric store. The term ferric covers stores using ferro-electric or ferro-magnetic materials. For the purposes of description of the invention herein, only ferro-magnetic material is considered. Such material has a high value of permeability and can be magnetised so as to be left at a positive or negative state of remanence. The remanence and saturation values are very similar and the hysteresis loop substantially rectangular. A store may consist of a ferrite block wherein there are a number of holes, the material around each hole forming a digit cell, each hole being individually threaded by its own row wire and all holes threaded by a common column wire and a common output wire. To store intelligence in such a store in which all the cells are initially in a 0 condition, it is necessary to apply negative electrical pulses to the wires threading the individual holes of cells in which 1 is to be stored. Since all cells are threaded by a common column wire and each cell has its own row wire, the correct pulse amplitude to change the state of magnetisation of a single cell of the column can be restricted to that cell by the unique combination of wires threading it, i.e. the common column wire and its individual row wire. The pulses so applied are termed half-write pulses because they are each of half the amplitude necessary for changing the cell to the 1 condition, these half-write pulses must be applied over both the column wire and the row wire simultaneously. Similarly to read the contents of a cell it is necessary to apply half-read pulses of opposite polarity simultaneously over the column and row wires.

It will be seen that, by reading the condition of a cell, the contents, if in the 1 condition, are destroyed. In many cases, as in the invention to be described, it is necessary to re-write the information either immediately or with a delay. Immediate re-writing is achieved by following the half-read pulses by half-write pulses over the column and row wires unique to the cell. The combined magnitude of these two half-write pulses are sufficient to return the cell to its former condition. If such re-writing is to be delayed such that the condition is to be written in the next cell of the column, such a delay may be accomplished by the use of one or more bi-stable triggers, which only allow re-writing to take place on the appearance of a succeeding half-write pulse.

A co-ordinate array of rows and columns of cells could be obtained by arranging a number of blocks one above the other thus forming a number of stores. Each block would constitute a row, the holes of which would be threaded by a common row wire, the column wires would be threaded through like holes in each block. Such a co-ordinate array could be used for parallel storage; in other words the rows are set simultaneously and read simultaneously. Thus in writing in intelligence, a single row wire and a selection of column wires, corresponding to the cells in the row which are to receive a 1 digit have half-write pulses of negative polarity applied to them simultaneously. Similarly, half-read pulses of positive polarity applied in the same manner would allow the cells to be read. Alternatively, and if it was only required to use one store of a group at a time, all columns could be threaded by a common column wire with gating means for each column whereby, whilst all row wires would be scanned in sequence by the half-read/half-write series, only the column required would be connected for a similar half-read/half-write series to the pulse source via its respective gate. The output conductor could, of course, in this case, be common to all columns, since only one column is read at any one time during the scanning cycle.

Similar stores may be obtained by arranging a number of ferro-magnetic toroids in a co-ordinate array, each of which forms a separate digit cell. Here again the row, column, and output wires would be in similar arrangement to that described.

The single column decimal number counter described in this invention is constituted by a single column store and consists of one or more ferro-magnetic blocks containing a total of 30 holes, each forming a "digit" cell the material around which, dependent on its state of magnetisation, may be in a 0 or 1 condition. In a positively magnetised state a cell is set to the 0 condition, whilst when in a negatively magnetised state it is set to the 1 condition. The thirty cells are divided into three groups of ten cells i.e. the digital basis, which represent "units," "tens" and "hundreds" decades, such that the column as a whole may function as a three decade decimal counter capable of counting from 000 to 999. The first to the tenth cells inclusive of each decade are consecutively representative of a digits value from "zero" to "nine" and it is so arranged that only one cell of each decade is in the 1 condition at any time, such a condition being representative of the digit value of its particular decade. Thus a 1 condition in the last cells of each decade would be representative of the number 999, whereas a similar condition in the first cells of those decades would be representative of 000.

The processes of countnig, zeroising, each decade as the "nine" cells are reached, and the carrying from "units" to "tens" and "tens" to "hundreds" decades are accomplished by the use of a wave-form generator and distributors which constitute an access selector and which, in response to an external counting signal, applies a series of half-read/half-write pulses to each of the row wires threading the cells. For each row wire pulsed, there is simultaneously applied a similar series of half-read/half-write pulses to the single column wire threading all the cells of the column. The application of these pulse series enables the number stored in the cells of the column to be read, and, in conjunction with logic control circuits appendent to the column, allows the setting of all three decades to be changed in steps of 1 from 000 to 999. The sequence with which the cells of each decade are scanned, i.e. pulsed, is as follows: The "zero" cell to the "nine" cell of the units decade and back to the "zero" cell again, followed by the same sequence for the "tens" and "hundreds" decades respectively. Referring to FIG. 1 in which the access selector circuits and a single column counter 21 are shown, the thirty cells are arranged, as stated, in three decade groups. The "zero" to "nine" cells of the "units," "tens" and "hundreds" decades are threaded by row wires "0X" to "9X," "10X" to "19X" and "20X" to "29X" respectively, and it is so arranged that these cells are pulsed, via their row wires, during one cycle of the access selector, by half-read/half-write pulses designated 1W1 and 1W2 from the wave-form generator (not shown), in the following irregular sequence:

Units decade: "0X" to "9X" followed by "0X" again
Tens decade: "10X" to "19X" followed by "10X" again
Hundreds decade: "20X" to "29X" followed by "20X" again A similar series of 1W1 and 1W2 pulses are applied simultaneously over the wire threading all the cells of the column. This is to cater for transfer from cell 9 back to cell 0 in each decade on the closed loop basis, and to cater for transfer from units to tens, and so on, when each decade steps from 9 to 0. Thus it will be seen that as the "units," "tens" and "hundreds" decades are successively scanned, the "zero" cell of each decade is pulsed twice, once at the beginning and once at the end of the period of the scanning cycle apportioned to that decade.

The operating pulses for the various cells, as well as for other components of the circuit, are controlled by gates of a well known type. These gates have been illustrated in the drawings as circles with radial lines extending outwardly from their circumferences. The radial lines provided with inwardly pointing arrows indicate separate inputs; the single line without an arrow represents the output. The numeral inside the circle indicates the number of inputs which must be energized to permit an output voltage to appear on the output line. Thus, a 3 in a circle indicates that it is an "AND" gate and that three of the input circuits must be energized to produce an output from the gate; a 1 in a circle indicates that it is an "OR" gate and that any one of the input circuits which is energized will produce an output.

Each row has three appendant gates, such as "AND" gates 1G0A, 1G0B, and "OR" gate 1G0C for row "0X" and "AND" gates 1G1A, 1G1B and "OR" gate 1G1C (not shown) for row "1X," etc. The half-read series (1W1) are gated to the rows via gates having suffixes A and C, whilst the half-write series (1W2) are gated to the rows via gates having suffixes B and C, the C gate being common to A and B gates of each row. For the sake of clarity in FIG. 1, only gates 1G0A, B and C, 1G9A, B and C, 1G10A, B and C, 1G19A, B and C, 1G20A, B and C and 1G29A, B and C have been shown. Gates 1G0A, B and C to 1G9A, B and C serve rows "0X" to "9X," 1G10A, B and C to 1G19A, B and C serve rows "10X" to "19X," and 1G20A, B and C to 1G29A, B and C serve rows "20X" to "29X" respectively.

The half-read/half-write series of pulses are always being applied to the A and B "AND" gates; their subsequent application to the cells of the decades in the desired irregular sequence is dependent on the appearance also at the A and B "AND" gates, of two control conditions of positive polarity, one from each of the stages of distributors 11C and 12C. Distributor 11C is capable of providing three control conditions designated 11C1, 11C2 and 11C3. Whilst distributor 12C is capable of providing eleven control conditions designated 12C0 to 12C10. It is so arranged that in combination they will provide thirty three pairs of conditions in three groups of eleven pairs, such that each decade of the counter is assigned one group. Due to the fact that the 1W2 series of half-write pulses are of negative polarity, and that 11C1 to 11C3 and 12C0 to 12C10 are of positive polarity, it is necessary to invert them by an inverter of a well known type before their application to the B "AND" gates of each of the rows "0X" to "29X." These inverters would be inserted between the terminal points for conditions from counters 11C and 12C and the B gates; however for the sake of clarity in FIG. 1 the inverters have been omitted. It will be seen that conditions 12C0 and 12C10 of each group are commoned. Thus although there are thirty three pairs of conditions, they may be taken out by thirty pairs of conductors as thirty pairs of conditions. These thirty pairs of conductors from distributors 11C and 12C are applied to "AND" gates 1G0A and B and to 1G29A and B via thirty pairs of terminals on a cross-connecting frame F1, and their appearance in an irregular sequence at these gates allows gating of the 1W1/1W2 half-read/half-write series to the cells of the three decades. It will be seen therein that the "zero" cells of each decade are pulsed twice during each scanning cycle. This is due to the fact that whilst each "AND" gate to a cell requires three conditions to operate it, such as one from each of distributors 11C and 12C with the 1W1/1W2 series "AND" gates 1G0A and B, 1G10A and B and 1G20A and B to the "zero" cells of the three decades have the choice of two conditions from distributor 12C such conditions being 12C0 or 12C10. If referenece is made to FIG. 1 it will be seen that a separate output is taken from counter 12C at position 12C10 from its left side. This output is taken to "AND" gate 1G32 to enable counter 11C to be stepped each time position 12C10 only is reached, i.e. as the zero rows of each decade are scanned for the second time.

Having now described the operation of the access selector, the process of counting will now be dealt with, and for the purpose of the description it will be considered that for each external counting signal, such as "S," the access selector makes one cycle during which time the counter is advanced by a unit value of 1.

Figure 2:
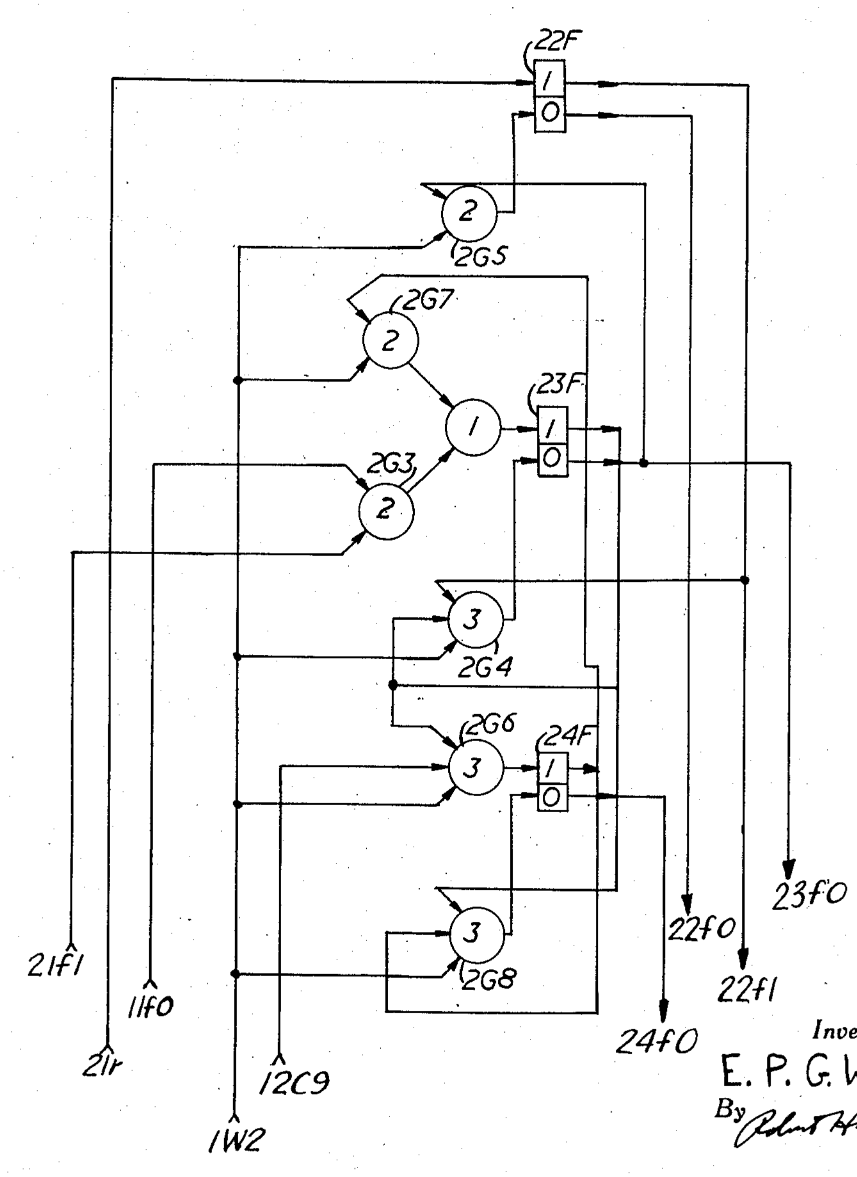
FIG. 2, shows the logic control circuits appendent to either a single column counter or common to a number of single column counters not used simultaneously.
Figure 4:
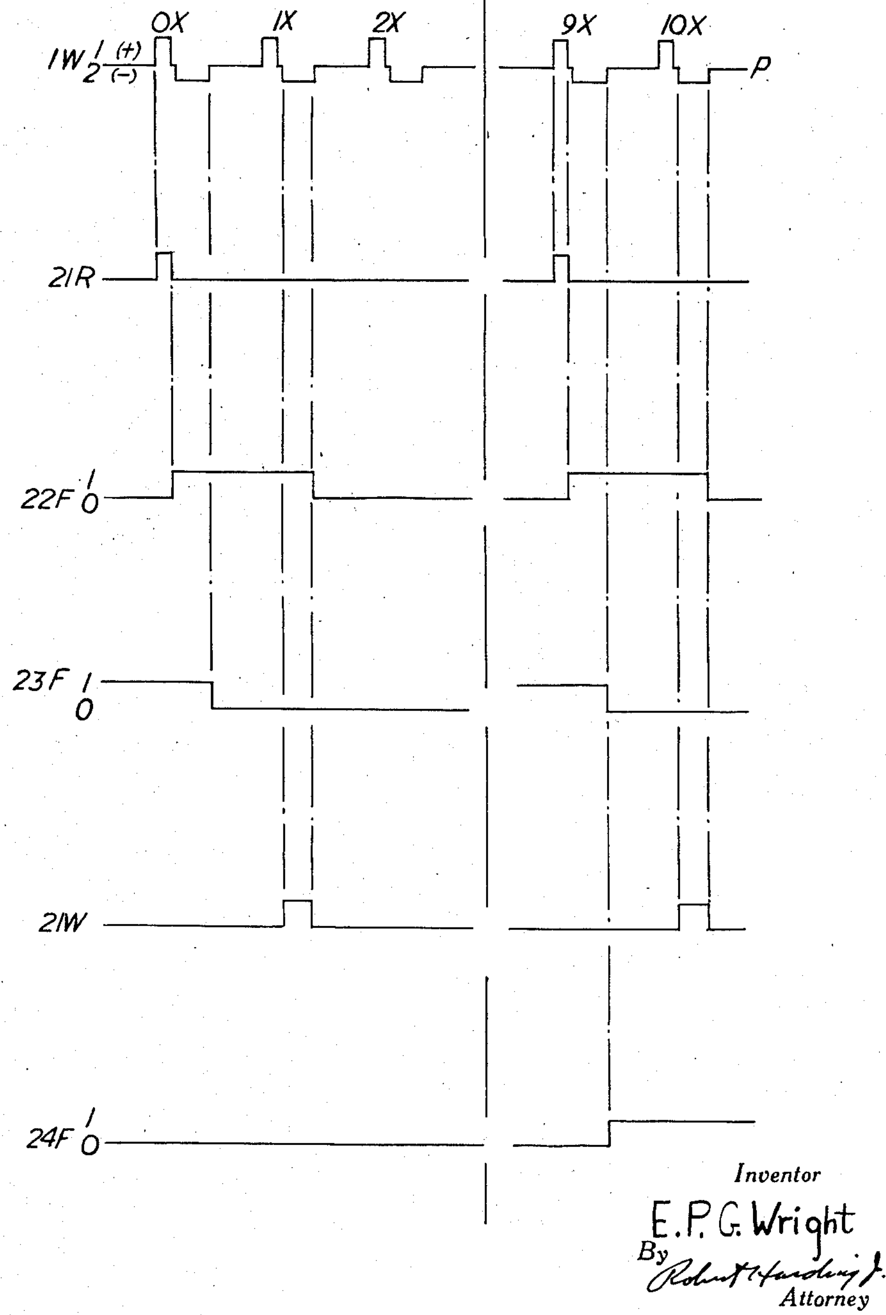
FIG. 4, shows a time scale of events during counting and zeroising.

Reference should be made to FIGS. 1, 2 and 4 in which FIG. 1 shows the access selector and single column counter 21, FIG. 2 shows the logic control circuits appendent to the single column counter and FIG. 4 shows a time scale of events during counting and zeroising as the "nine" digits of the decades are reached. The half-read series are shown as positive pulses designated 1W1(+), whilst the half-write series are shown as negative pulses designated 1W2(—) above and below, respectively, a mean line designated P.

It will readily be seen that for each of the rows to be scanned, i.e., rows "0X", "1X", "2X" etc., there is one half-read pulse followed after a short delay by one half-write pulse followed further by a quiescent period, the total duration between the onset of one half-read pulse to the next being in the order of 20 microseconds. It should be noted at this stage that the triggers shown in all figures and having the suffix F operate at the conclusion of the conditions causing operation and are of the type described in U.S. Patent No. 2,933,688, issued April 19, 1960.

To set these triggers from the 0 condition to the 1 condition, it is necessary to apply potentials of negative polarity to one or more "AND" gates appendant to the trigger. Similarly to set them from the 1 condition to the 0 condition it is necessary to apply potentials of positive polarity to one or more "AND" gates which are again appendant to the trigger. A trigger in the 1 condition will give an output of negative polarity, whilst when in the 0 condition it will give an output of positive polarity, these outputs being utilised for the performance of various functions in the system. However it will be seen that in the majority of triggers, and taking for example trigger 24F, FIG. 2, that certain pulses such as 23f1, 24f1 and 1W2, all of negative polarity, are applied to "AND" gate 2G8 which requires positive pulses in order to set 24F to 24f0. In such cases it should be considered that pulses 24f1, 23f1 and 1W2 have in fact been inverted to become pulses of positive polarity by an inverting means of a well known type inserted between the source of these pulses, such as trigger 24F, 23F and a waveform generator for the 1W2 pulse series, respectively.

Similarly, and with regard to "AND" gate 2G6 appendant to trigger 24F, it will be seen that pulses of negative polarity, such as 23f1 and 1W2, applied to this gate are of the correct polarity to set 24F to 24f1, i.e. the 1 condition; however, positive pulse 12C9 must be inverted and thus inversion by an inverting means between counter 12C and the gate must be incorporated. For the sake of clarity in FIGS. 1 to 3 inclusive, such inversion means have been omitted. Amplifiers, such as 21W and 21R, operate immediately without causing or awaiting conclusion of the conditions causing their operation.

In the initial and rest condition of the counter, the conditions of the cells are set so as to indicate 000 which implies that the "zero" cells of each decade are set to the 1 condition, whilst all others are set to 0. Distributors 11C and 12C are at positions 11C1 and 12C0, respectively.

When a signal "S" is applied to "AND" gate 2G9 FIG. 1, with conditions 11C1 and 12C0, trigger 21F is caused to conduct at 21f1. The output 21f1 prepares "AND" gate 1G30 which opens at the next 1W2 pulse to step the dis-applied to the column wire via 21W and 1G33. Simultanteously the 1W1 also causes "AND" gate 1G0A to open and a half-read pulse to be applied via "OR" gate 1G0C to the row wire "0X" threading the "zero" cell of the units decade, causing the cell on the row wire "0X" to be read. Since this cell is in the 1 condition indicating the "zero" digit for the decade, an output pulse will appear on the separate output conductor threading all the cells of the column, thereby causing the output amplifier 21R to conduct.

In addition to preparing the "AND" gate 1G33, the pulse 21f1 is also applied to the trigger 11F which conducts at 11F1. A pulse 11f1 is applied to "AND" gate 1G30 which opens at the next 1W2 pulse to step the distributor 12C to 12C1 in preparation for writing the 1 read from the cell or row wire "0X" in the cell or row wire "1X."

Reverting now to the 1 read from the cell on row wire "0X", the output 21r of the amplifier 21R is applied to 22F (FIG. 2) which conducts at 22F1. The "zero" cell is now set to the 0 condition and it is necessary to add 1 to the "units" decade record by re-writing the 1 condition into the "one" cell on row "1X" which is the next row to be scanned. As the normal following half-write pulse 1W2 would re-write the condition back into the "zero" cell, it is necessary to delay re-writing until the appearance of the next 1W2 pulse which occurs as row "1X" is scanned when the "one" cell on that row will be set to the 1 condition. It is the purpose of trigger 23F shown in FIG. 2 to effect this delay. As already explained, 22F is set to 22F1 by the 1 read from the cell on row wire 0X, 22f1 and 23f1 together prepare "AND" gate 2G4 so that on the immediately following 1W2 pulse 2G4 opens and 23F is set to 23F0. The counter 12C now steps to 12C1 and half-read pulses are applied to the row wire 1X and the column wire. No output pulse appears on the column wire, however, since that cell is in the 0 condition, so 22F1 remains conducting as does 23F0. 22f1 and 23f0 prepare "AND" gate 2G1, FIG. 1, so that on the following 1W2 pulse, i.e. the normal writing pulse for the "one" cell on row "1X", 2G1 opens and the amplifier 21W is caused to conduct and apply a half-write pulse to the column wire. This, together with the half-write pulse on the row wire 1X, causes the "one" cell to be set to the 1 condition. The same 1W2 pulse resets 22F to 22F0 via 2G5. Thus the 1 originally stored in the "zero" cell on row "0X" is advanced to the "one" cell in row "1X" and the record is therefore advanced from 000 to 001. However, the remaining cells of the "units" decade, followed by all those in the "tens" and "hundreds" decades need to be scanned to examine their condition, and to re-write the 1 conditions in the "zero" cells of those decades without delay in the same rows "10X" and "20X," since no advancement of the record in these decades is required. As the condition of the "two" to "nine" cells inclusive and the "zero" cell of the units decade are in a 0 condition, the conditions of the cells are left unchanged, there being no outputs as they are scanned, and thus there will be no operation of the logic control circuits. Re-writing the 1 condition read from the "zero" cell in row "0X" into the "one" cell on row "1X" was previously accomplished by the fact that 23F was changed from 23f1 to 23f0 on the normal writing pulse following 1 being read from the "zero" cell on row "0X" of the "units" decade, whereas for writing back into the same cell after reading necessitates 23f0 being already conducting, and being present with 22f1 at "AND" gate 2G1 to writing amplifier 21W.

In the cases now to be considered where the 1 conditions read from "zero" cells of the "tens" and "hundreds" decades is to be re-written back into those cells, no such delay will occur since 23f0 will still be conducting as the rows on which those cells stand are scanned. Thus 23f0 will be present at "AND" gate 2G1 with 22f1 which conducts through 1 being read from the "zero" cells of those decades. When the following 1W2 pulse appears "AND" gate 2G1 will conduct, as will in turn writing amplifier 21W, and the 1 condition will immediately be re-written. At the termination of the scanning cycle, 11f0 conducts on the appearance of 11C3, 12C10 at "AND" gate 1G31 when the half-write pulse 1W2 terminates, and on the commencement of the next scanning cycle when the next counting signal "S" appears, 21f1 conducts via "AND" gate 2G9 through the appearances of 11C1, 12C10 and "S." The appearance of 11f0 and 21f1 at gate 2G3 causes 23f1 to conduct. This re-setting occurs on each successive scanning cycle.

It is now necessary to consider the conditions during counting where either the "units," "tens" or "hundreds" digits has advanced from the cells indicating their "zero" positions, i.e. on rows "0X," "10X" and "20X" to the cells indicating their "nine" positions i.e. on rows "9X," "19X" and "29X." As has already been fully described, the access selector scanning cycle allows the rows to be pulsed in the following order 0X to 9X, 0X, 10X to 19X, 10X, 20X to 29X, 20X, this irregularity in scanning enabling zeroising of the decades digits when they have reached their respective "nine" cells, and also the carrying over from one decade to the next. An example of this process of zeroising and carrying is now to be described. In this instance it should be considered that the counter is about to step from 009 to 010. Through this condition, it is not only necessary to re-write the 1 stored in the "nine" cell of row "9X" of the "units" decade into the "zero" cell on row "0X" of the same decade, but also to advance the "tens" decade digit from the "zero" cell of that decade on row "10X" to the "one" cell on row "11X" of the same decade. As row "9X" is scanned and the 1 condition is read from the "nine" cell, 21R is caused to conduct and 21R causes 22f1 to conduct, 22f1 appears at "AND" gate 2G4 with 23f1 and on conclusion of the following half-write pulse 1W2, 23f0 conducts. 23f0 and 22f1 appear at "AND" gate 2G1, and on the succeeding 1W2 pulse during which row "0X" is again scanned for the second time during the access selector cycle, 21W conducts and the 1 read from the "nine" cell on row "9X" is re-written in the "zero" cell on row "0X." Meanwhile condition 12C9, as well as having appeared with 11C1 at "AND" gates 1G9A and B to enable row "9X" to be pulsed via "OR" gate 1G9C, has also appeared at "AND" gate 2G6 to trigger 24F with 23f1, and on the termination of half-write pulse 1W2 on which row "9X" is scanned, 24f1 conducts and appears at "AND" gate 2G7, and on the termination of the following 1W2 pulse 23f1 conducts. When the "zero" cell on row "10X" of the "tens" decade is next read and since a 1 condition is stored therein 21R conducts and 21r causes 22f1 to conduct. Re-writing back into the "zero" cell immediately is prevented, since 23f1 is conducting so that 23f1 and 22f1 appear at "AND" gate 2G4. On the following 1W2 pulse terminating, 23f0 conducts and appears at "AND" gate 2G5 to 22F, and at "AND" gate 2G1 to amplifier 21W. When row "11X" is scanned following row "10X," and on the 1W2 pulse gate 2G4 conducts and the 1 condition read from the "zero" cell of the "tens" decade on row "10X" is re-written in the "one" cell of the same decade on row "11X." At the same time 22f0 is caused to conduct on termination of the associated 1W2 pulses, 23f1 and 24f1 present at "AND" gate 2G8 resets 24F to 24f0.

Hence a carry from the "units" decade to the "tens" decade has been accomplished. A carry from the "tens" decade to the "hundreds" decade would be accomplished in a like manner, since the conditions of the logic control triggers involved would be set to function as already described. It will also be further apparent to those skilled in the art that the conditions read from the decades as they are scanned may be transferred from trigger 22F to the same other storage medium such as a magnetic drum or a shift register, or held in a set of storage triggers to await further processing. Such a transferring process is described in my co-pending application Serial No. 695,363, filed November 8, 1957.

Whilst the operation of a three decade counter has been described herein, a counter accommodating more decades per column could be provided by increasing (per extra decade) the number of cells per column by tens, each with appendant gates, such as "AND" gates 1G0A, B and "OR" gate 1G0C, and a pair of terminals on cross-connecting frame F1, and by adding an extra position to distributor 11C.

From a pure counting point of view, the sequence in which decades are scanned could be arranged so that the scanning can be limited to those decades in which changes are to be made. Nine times out of ten, the first decade only is to be changed, and reading and recording could be limited thereto. In the remaining operations, the second, second and third, . . . decades have to be changed according to the numbers already recorded according to whether the record being read does not or does include a "nine" in the "units" decade, "tens" decade, and so on, thus reducing the scanning cycle. Although counting as applied to the decimal system has been described, the counting system need not necessarily be confined to that system alone.

Figure 3:
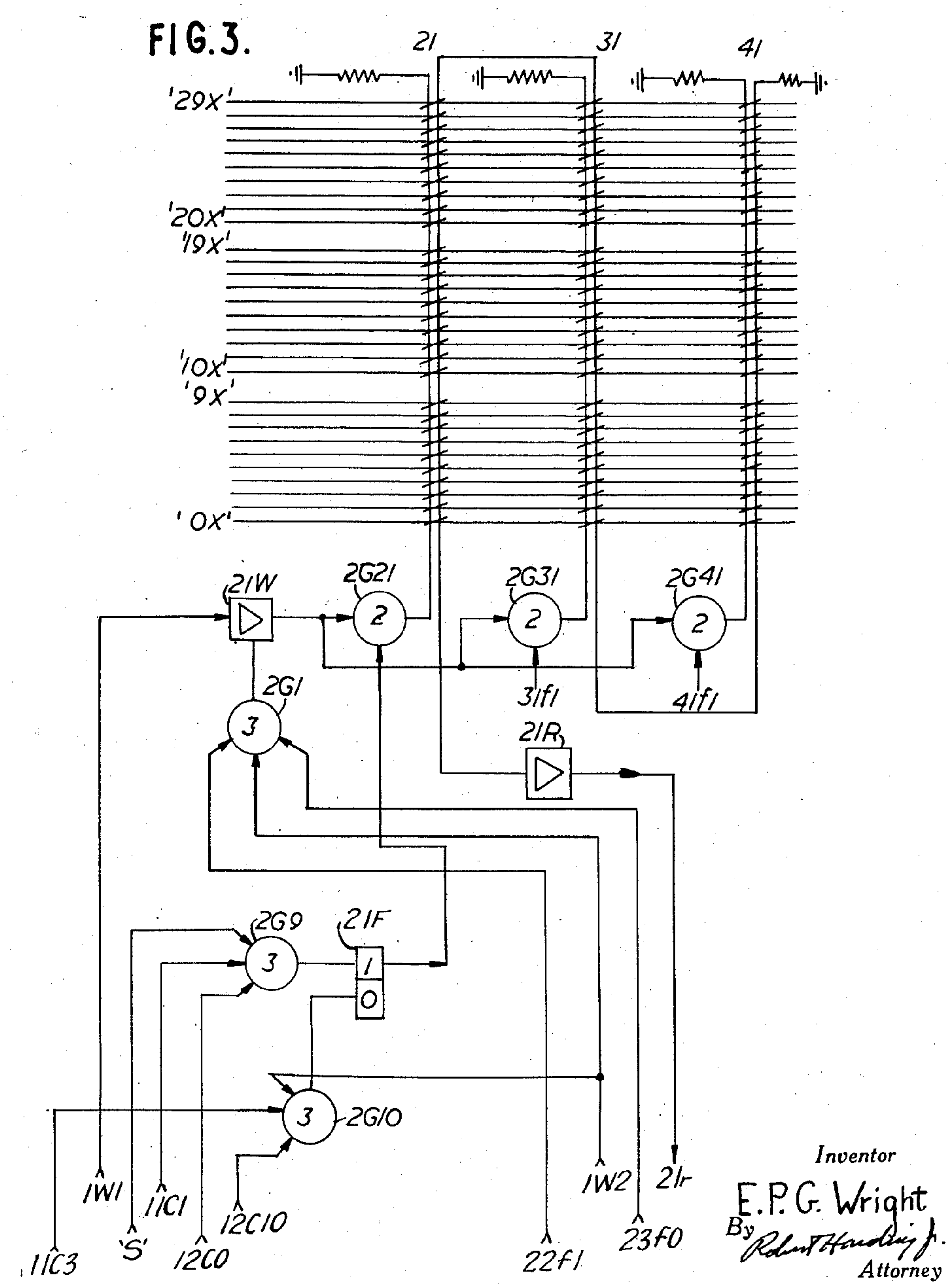
FIG. 3, shows a number of single column counters, each with a separate start device.

An application of the present invention is now to be described in connection with issuing of a serial number to telegraph messages, and wherein a number of single column counters, each particular to a telegraph line circuit, use a common set of logic control triggers. This application is described with reference to FIG. 1 which shows an access selector common to all columns, FIG. 2 shows a set of logic control triggers also common to all columns, and FIG. 3 shows a number of single column counters each particular to a telegraph line circuit and with its own start trigger, such as 21F, 31F or 41F. Operation of the circuits with regard to column 21 only are to be considered in this application.

When a telegraph message is about to be sent, it is necessary to know its serial number; this can be determined by a single column counter, such as that already described Since it is not required to operate more than one counter at a time, it is possible to use a common access selector and common logic control circuits.

If reference is made to FIG. 3, it will be seen that in this case three single column counters, which may be formed by a number of ferro-magnetic blocks, are served by common row wires from one access selector shown in FIG. 1. Each column serves a separate incoming telegraph line circuit and carries out the processes of counting, storing and indicating a decimal number series particular to that line circuit. Although only three columns are shown, a much larger number could be accommodated. The cells of all columns are threaded in turn by a single output conductor terminating at a common output amplifier 21R. Each column has a separate column wire over which the half-read/half-write waveforms 1W1 and 1W2 are pulsed via a both-way transistor such as 2G21, individual to that column, from the writing amplifier 21W common to all columns. The transistors act as switches and it is so arranged that the writing amplifier is only connected to a column when a start signal, such as "S," (equivalent to the counting signal "S" referred to in the single column counter previously described) causes a start trigger, such as 21F, particular to that column and its associated line circuit, to conduct at 21F1. 21f1 appears at the switch and the 1W1 and 1W2 pulses are then gated to the column. It will be seen that by this arrangement, the serial numbers recorded in the columns which are associated with other telegraph line circuits are left unchanged, since application of the 1W1/1W2 series of half-read/half-write pulses is prevented by the non-conductance of their respective switches such as "AND" gates 2G31 and 2G41.

Arrangements would be made in the telegraph line circuits to ensure that not more than one start signal could be applied to the counter circuits at a time; hence only one counter would be operating during the cycle of the access selector. Triggers 22F, 23F and 24F of the logic control circuits, shown in FIG. 2, and associated with the single column, shown in FIG. 1, are in this instance common to all columns, since only one column will require to operate in co-operation with them at a time. It will readily be seen that the processes of counting, zeroising and carrying will be accomplished in precisely the same manner as already described. The serial number so read from any column in response to a start signal appearing on its appendent telegraph line circuit will be withdrawn for further processing and the record advanced by a "units" value of 1, such that the new total is indicative of the next serial number.

While the principles of the invention have been described above in connection with specific embodiments, and particular modifications thereof, it is to be clearly understood that this description is made only by way of example and not as a limitation on the scope of the invention.

What I claim is:

1. A counter distributor for numbers having a plurality of digits comprising a plurality of sets of storage cells, each cell being capable of assuming either a first or a second condition, there being one set for each digit, each set having a number of storage cells equal to the digital basis, and the value of the digit represented by a set being given by the particular cell in the set which is in said first condition, means for operating on a cell to shift it from one condition to the other, counting means connected to said operating means for sequentially connecting said operating means to said cells of each set in succession beginning with the cell corresponding to the lowest digital value in the set representing the lowest denomination of the number, means responsive to a received signal for initiating the operation of said counting means, storing means connected in common to said cells and operable when a cell is shifted from said first condition to said second condition, control means connected to said storing means and to said cell operating means and responsive to said storing means for causing said operating means to shift a cell in the set of cells corresponding to the digit of lowest denomination to which it is connected from the second to the first condition when the preceding cell has been shifted by said operating means from said first to said second condition, means connected to said counting means and to said control means for altering the operation of said control means, so as to cause said cell operating means to shift the condition of a cell in a set, other than that for the lowest denomination, from said second to said first condition immediately after said same cell has been shifted from said first to said second condition, and means for repeating the sequential connections, thus defined, on a cyclical basis.

2. A counter distributor for numbers having a plurality of digits, as defined in claim 1, further comprising means connected to said altering means for preventing the operation of said altering means when the cell of the highest digital value in the set of next lower denomination has been shifted from the first to the second condition in the next previous connection of said operating means to said last-mentioned cell.

3. A counter distributor for numbers having a plurality of digits, as defined in claim 1, in which the counting means comprises means for connecting the operating means to the first cell of a set for the second time after said operating means has been sequentially connected to all the cells of said set and before the sequential connection to the cells of the succeeding set.

4. A counter distributor for numbers having a plurality of digits, as defined in claim 3, in which the counting means comprises a counter having a position corresponding to each cell of a set, and in which the means for connecting the operating means to the first cell of a set for the second time comprises an additional position on said counter with the output multipled to the output of the first position of said counter.

5. A counter distributor for numbers having a plurality of digits, as defined in claim 4, in which the control means comprises a bistable device and gating means for controlling said bistable device from the storing means, and the means for altering the operation of said control means comprises a bistable device and gating means controlling said bistable device from said control means and the counting means.

6. A counter distributor for numbers having a plurality of digits, as defined in claim 2, in which the control means comprises a bistable device and gating means for controlling said bistable device from the storing means, and the means for altering the operation of said control means comprises a bistable device and gating means controlling said bistable device from said control means and the counting means.

References Cited in the file of this patent

UNITED STATES PATENTS

| | | |
|---|---|---|
| 2,600,817 | Victoreen | June 17, 1952 |
| 2,657,272 | Dimon | Oct. 27, 1953 |
| 2,686,838 | Dehn | Aug. 17, 1954 |
| 2,702,666 | Dickinson | Feb. 22, 1955 |
| 2,750,580 | Rabenda et al. | June 12, 1956 |
| 2,832,951 | Browne | Apr. 29, 1958 |
| 2,844,815 | Winick | July 22, 1958 |
| 2,845,219 | Peil | July 29, 1958 |
| 2,907,525 | Hobbs | Oct. 6, 1959 |

FOREIGN PATENTS

| | | |
|---|---|---|
| 737,498 | Great Britain | Sept. 28, 1955 |
| 765,768 | Great Britain | Jan. 9, 1957 |